Feb. 7, 1950 A. J. KAYSER 2,496,876
HAY DISTRIBUTING TRUCK
Filed March 9, 1948 6 Sheets-Sheet 5
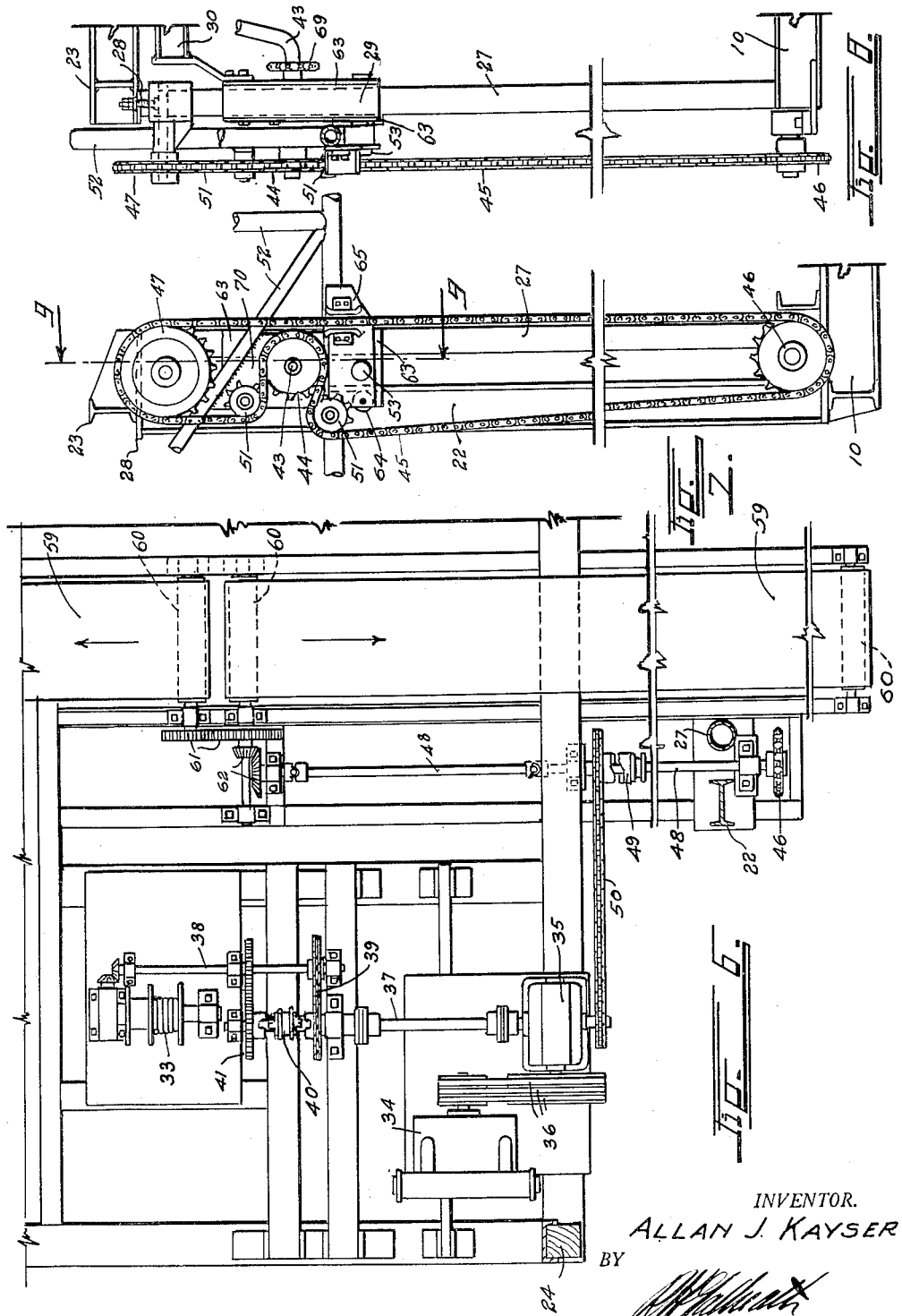
INVENTOR.
ALLAN J. KAYSER
BY
ATTORNEY.

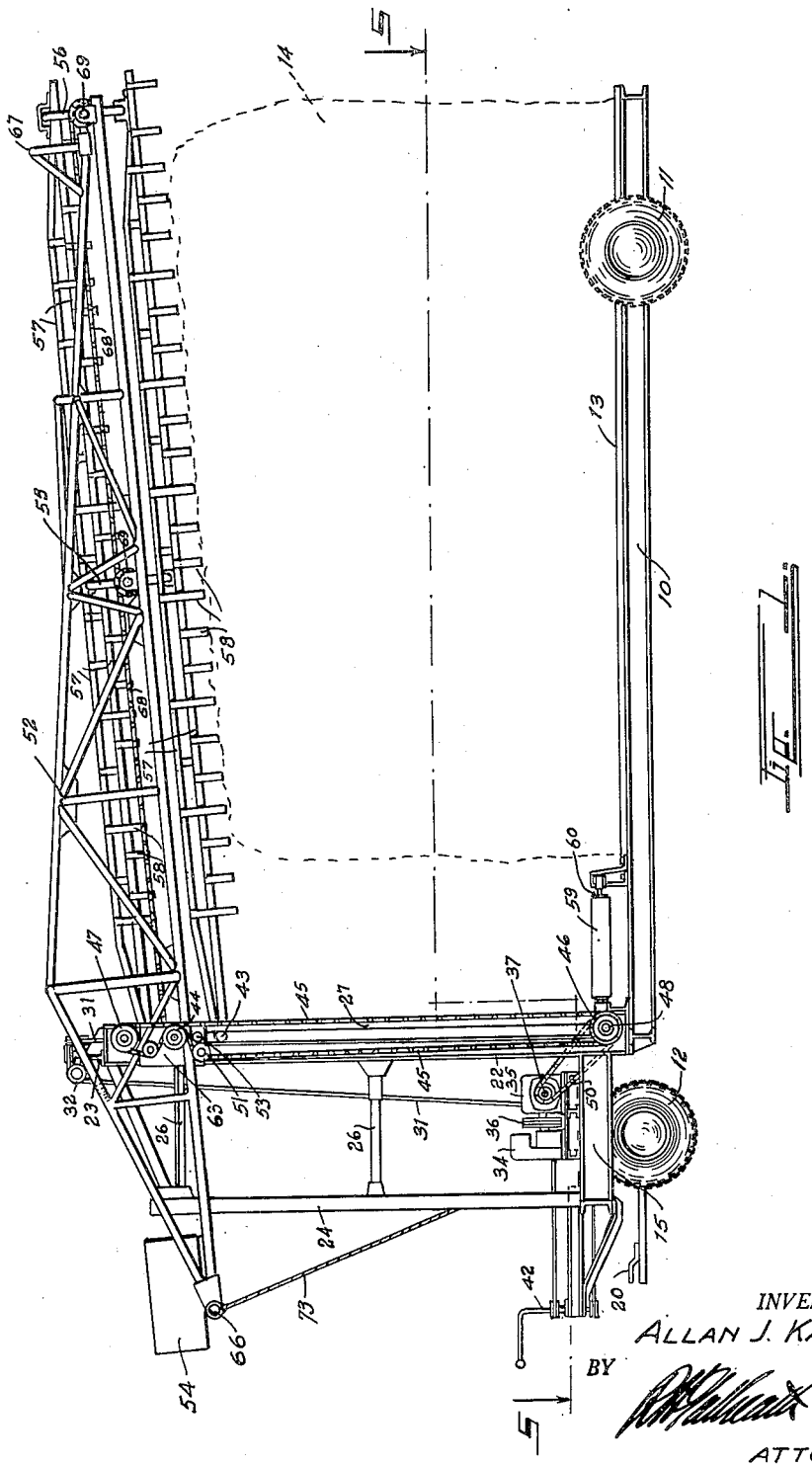

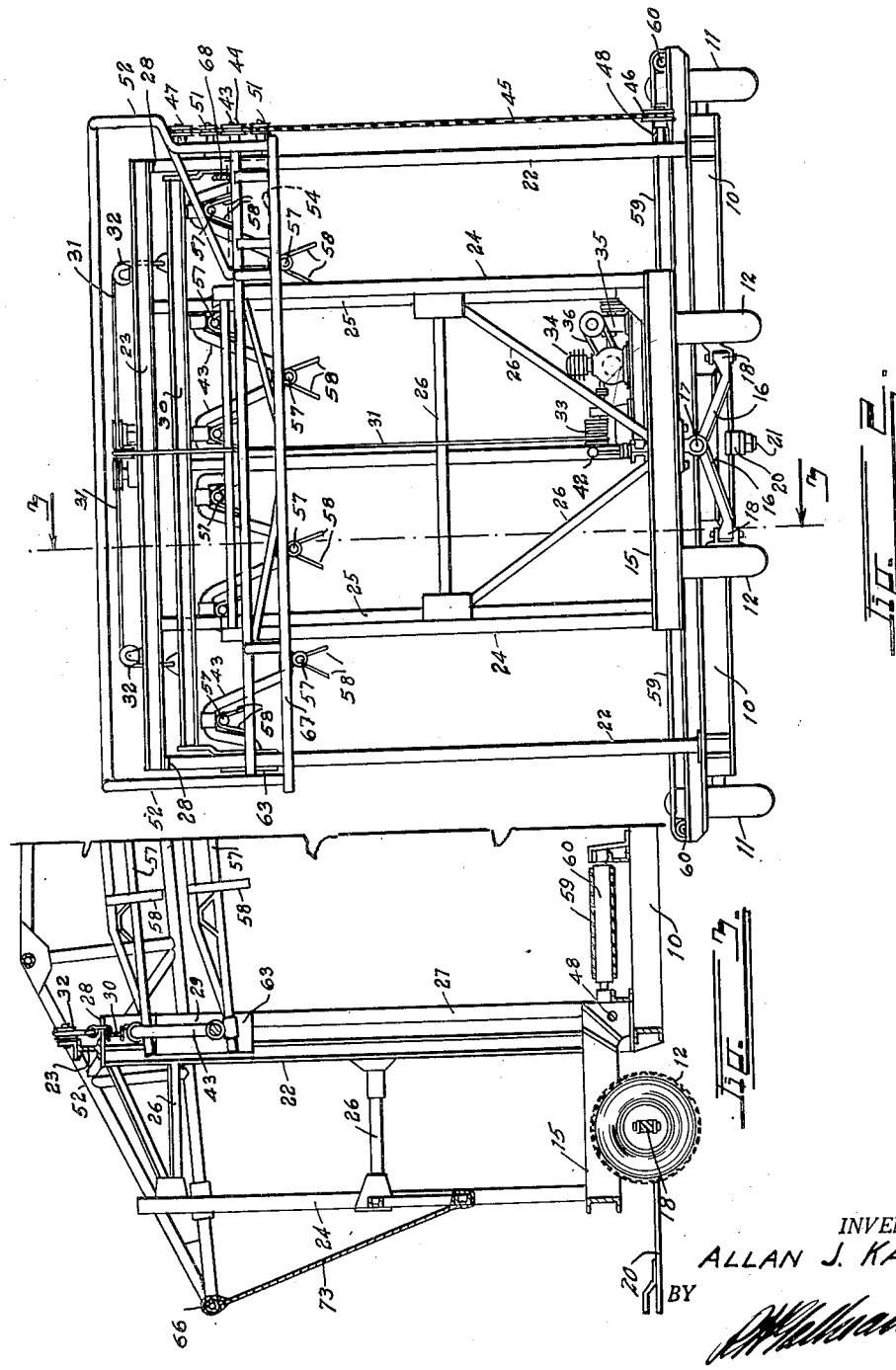

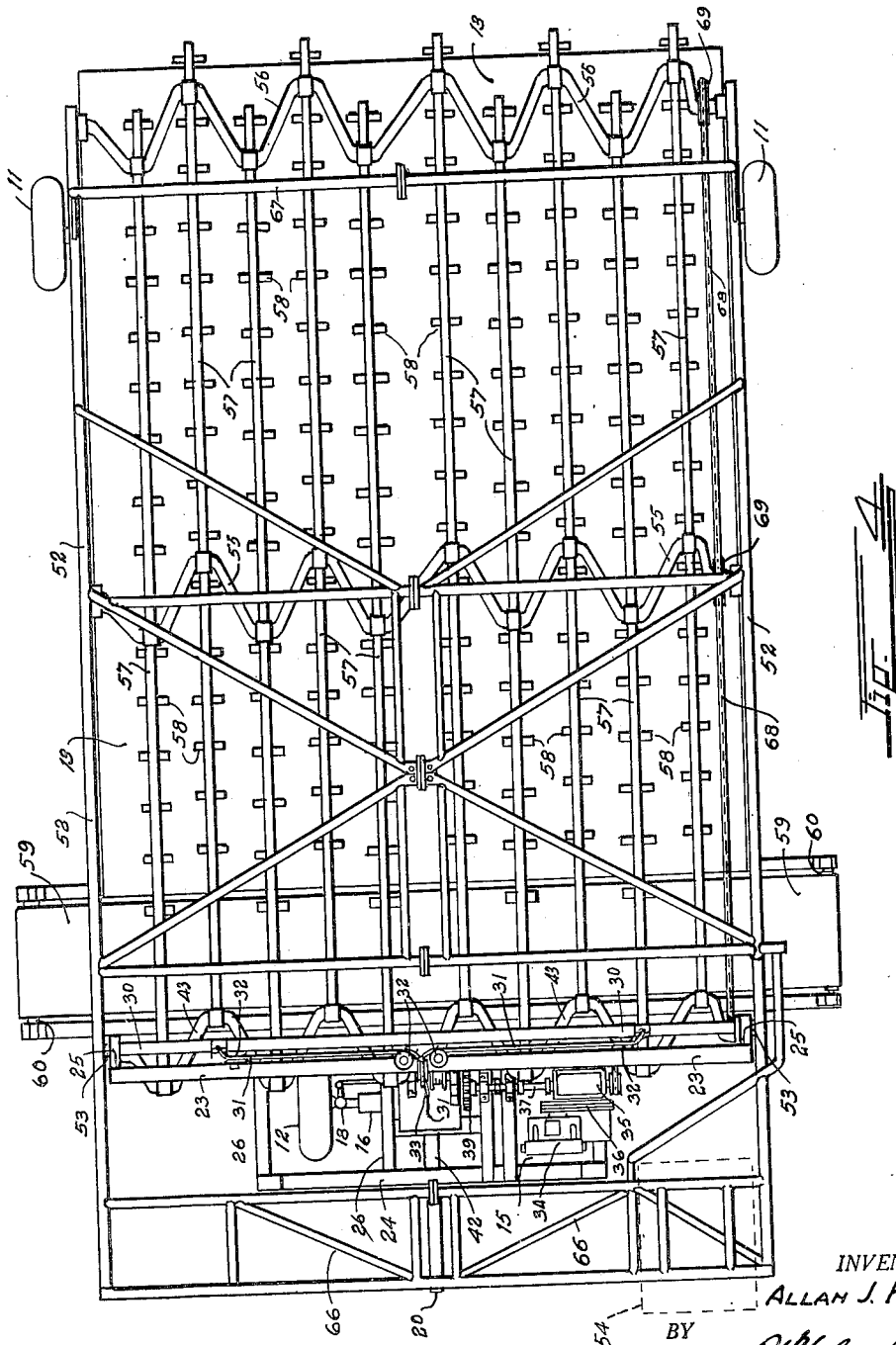

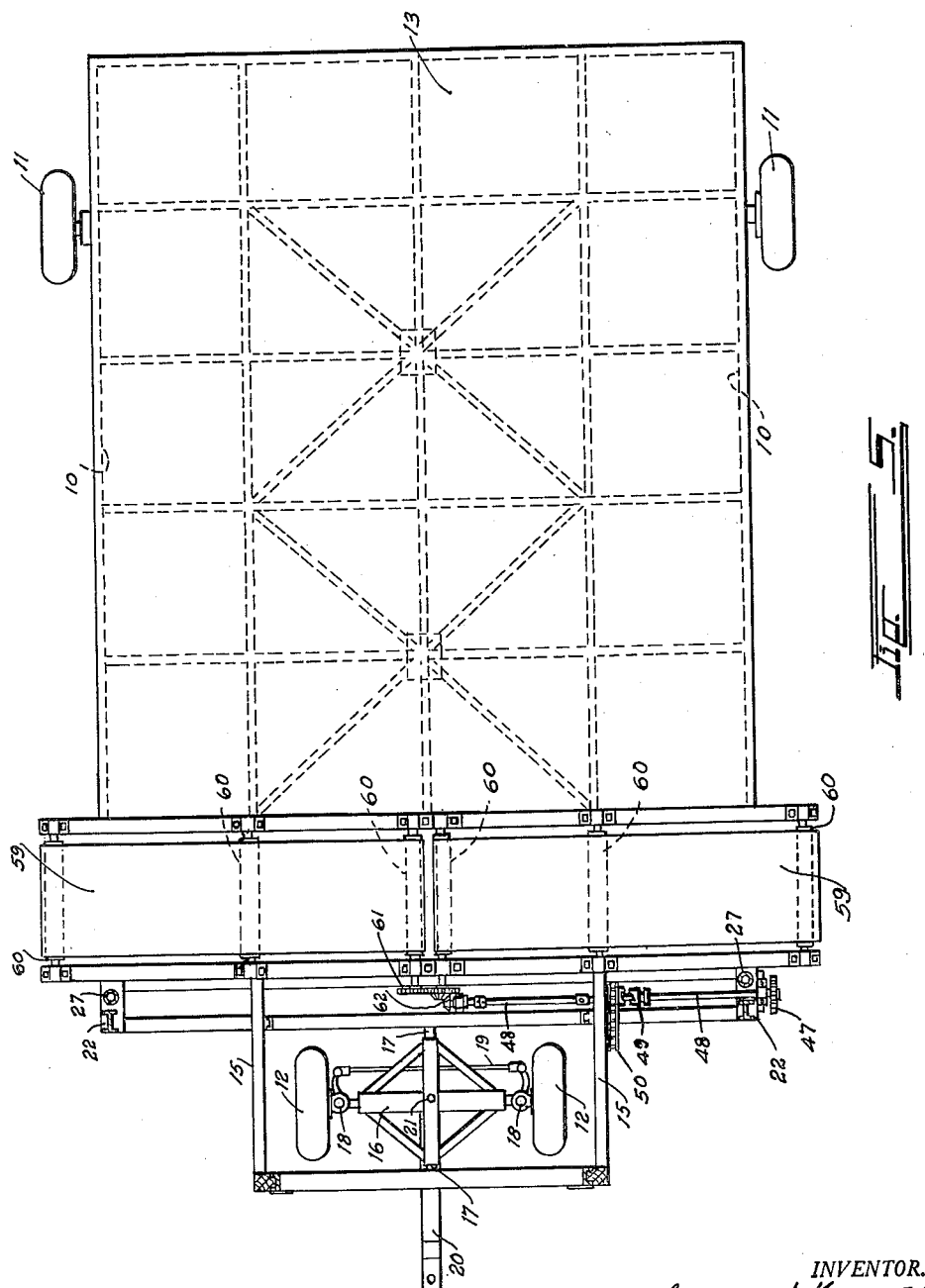

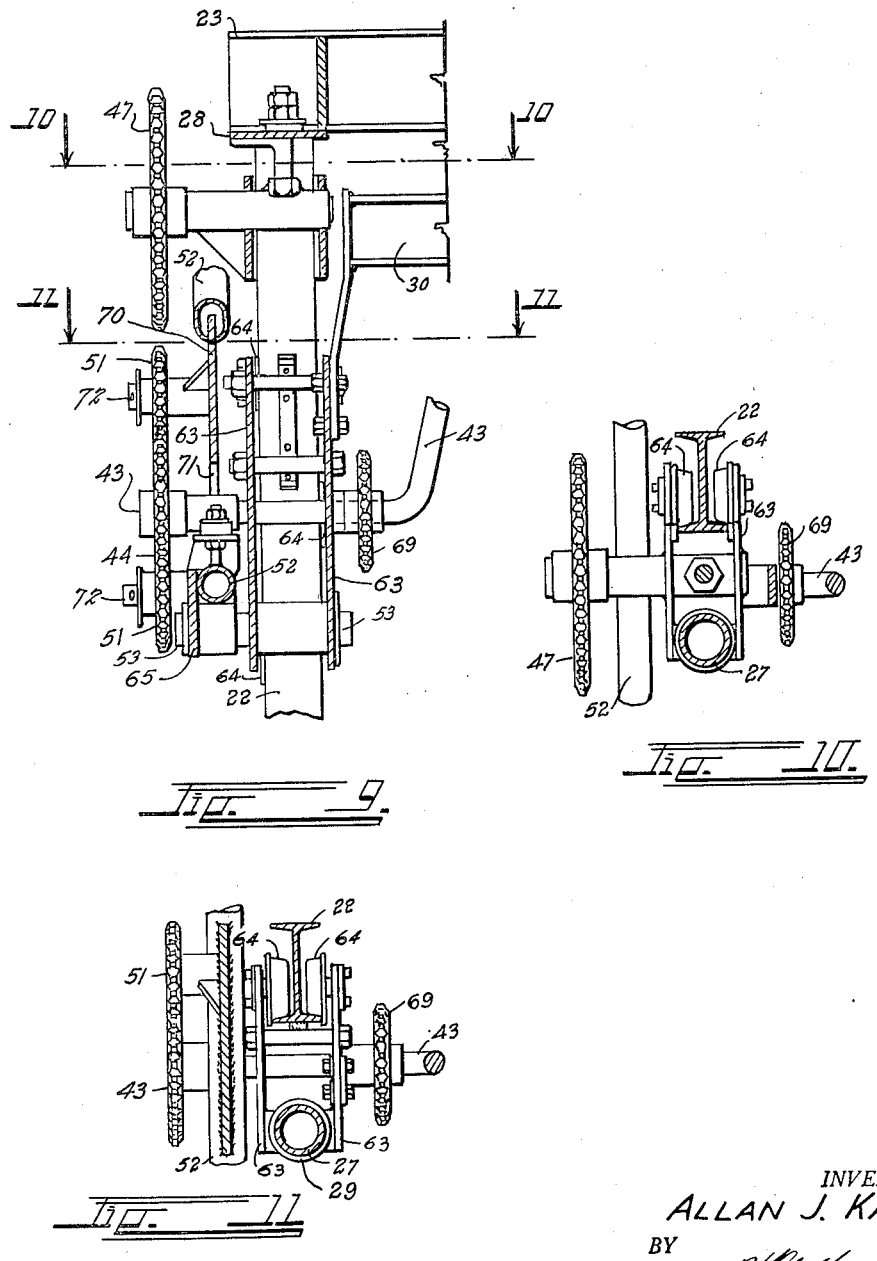

Patented Feb. 7, 1950

2,496,876

UNITED STATES PATENT OFFICE 2,496,876

HAY DISTRIBUTING TRUCK

Allan J. Kayser, Denver, Colo., assignor to K & K Manufacturing Company, Denver, Colo.

Application March 9, 1948, Serial No. 13,930

5 Claims. (Cl. 214—83.16)

This invention relates to a trailer for hauling a stack of hay and scattering the hay over large areas.

It is necessary on large cattle and sheep ranches during the winter months to scatter feed for the cattle and sheep over large, snow covered areas in order to provide winter range feed. This is usually accomplished by forking hay from a truck, but on large ranches this becomes an almost impossible task.

The principal object of this invention is to provide a vehicle upon which a complete hay stack may be loaded, and to provide power operated mechanism therein which will automatically fork the hay from the stack and distribute it in piles or windrows along both sides of the path of the vehicle.

Another object of the invention is to so construct the device that it may be trailed behind any suitable truck or towing vehicle, and to provide a mechanism which will require no extra man power other than the vehicle driver.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawings:

Fig. 1 is a side elevation of the improved trailer for hauling and scattering hay;

Fig. 2 is a front view thereof;

Fig. 3 is a fragmentary, vertical section, taken on the line 3—3, Fig. 2;

Fig. 4 is a plan view thereof;

Fig. 5 is a horizontal section, taken on the line 5—5, Fig. 1;

Fig. 6 is an enlarged, detail plan view of the power mechanism of the device;

Fig. 7 is a fragmentary, enlarged side view of a drive chain employed on the device;

Fig. 8 is a front view of the drive chain of Fig. 7, looking in the direction of the arrow 8, Fig. 7;

Fig. 9 is an enlarged detail section taken on the line 9—9, Fig. 7, with the drive chain omitted;

Fig. 10 is a similar enlarged detail section taken on the line 10—10, Fig. 9; and Fig. 11 is a similar section taken on the line 11—11, Fig. 9.

The improved hay scattering trailer comprises a chassis 10 carried on rear wheels 11 and front wheels 12. The chassis 10 supports a bed 13 for holding a stack of hay, as indicated in broken line at 14.

A platform 15 extends forwardly from the chassis 10 at a higher elevation than the latter and over the front wheels 12. The frame 15 carries a tiltable front axle frame 16 mounted on fore and aft tilting pivots 17.

A steering spindle 18 is carried at each side of the frame 16, and each spindle supports one of the front wheels 12. The two spindles are tied together by means of a tie rod 19 so that the two wheels will guide in unison. A towing tongue 20 extends forwardly from a tow pivot 21 at the bottom of the central portion of the wheel frame 16.

An I beam column 22 extends upwardly from each front corner of the chassis 10. The two columns 22 are connected across the top by means of a top beam 23 and are braced from a brace frame 24 extending upwardly from the forward portion of the platform 15.

Two vertical posts 25 extend upwardly from the forward edge of the chassis 10 to a connection with the cross beam 23. These posts are braced from the brace frame 24 by means of suitable cross braces 26 to hold the columns 22 rigidly vertical.

A slide tube or pipe 27 is supported rearwardly of each column 22 in vertical, spaced relation therewith by means of a cap plate 28. A sliding sleeve 29 is mounted on each pipe 27. Each sleeve 29 carries two side frame plates 63 extending on opposite sides of the columns 22. Each side plate 63 carries a pair of flanged rollers 64 which travel along the flanges of the I-beam columns 22. The two sleeves 29 are secured together across the frame by means of a cross bar 30 so that they will move vertically in unison. The cross bar 30 is supported by means of flexible cables 31 running over sheaves 32 to a winch drum 33 which is rotated from a suitable motor 34. Thus, it can be seen that the cross beam 30, the sleeves 29 and the side frame plates 63, can be raised and lowered along the guides 27.

The motor 34 drives a speed-reducing mechanism 35 through the medium of V-belts 36. The speed reducer drives a power shaft 37 which drives a clutch dog 40. The clutch dog 40 can be shifted back and forth to engage either a transmission chain device 39, for rotating the counter-shaft 38 in one direction, or a reverse gear 41 for rotating the counter-shaft 38 in the other direction.

The counter-shaft 38 is operatively connected to the winch 33. A clutch lever 42 extends to a convenient position for the operator to control the operation and direction of the winch drum 33.

An operating crank shaft 43 extends between the sleeves 29 below the cross beam 30 and is provided with a sprocket 44 at one of its extremities by means of which it is rotated from a drive chain 45. The drive chain extends from a drive sprocket 46 upwardly to an idler sprocket 47. The idler sprocket 47 is journalled at the top of one of the columns 22, and the sprocket 46 is fixed on a second counter-shaft 48. A clutch dog 49 is splined upon the second counter-shaft 48 so that it may be brought into operative engagement with a sprocket driven by means of a drive chain 50 from the power shaft 37.

The chain 45 is trained around guide sprockets 51 supported from the sleeve 29 which guide it around the sprocket 44. Thus, it can be seen that the engine 34 will rotate the operating crank shaft 43 at all vertical positions of the latter.

A cantilever truss frame 52 extends forwardly from each guide sleeve 29. The forward extremities of the two truss frames 52 are connected by means of a cross bar 67. A pivot plate 65 is secured to and extends downward from the lower member of each truss frame. The plates 65 are provided with bearing openings which are fitted over supporting studs 53 projecting outwardly from each pair of frame plates 63. The studs provide pivots for the truss frames 52 so that the latter may be tilted upwardly and downwardly. The truss frames project forwardly from the pivot points and are connected by means of a cross frame 66 which supports a counter-weight 54. The counter-weight 54 is adjusted to support the major portion of the weight of and on the two truss frames 52.

Two rotatable idler crank shafts 55 and 56 extend between the truss frames 52. All of the crank shafts are formed with a plurality of adjacent cranks positioned 90° apart. A plurality of parallel rake members 57 extend between the cranks of the crank shafts 43, 55, and 56. Each rake member is formed in the shape of a light truss to increase the strength and rigidity thereof and to decrease the weight. An endless tie chain extends about suitable chain sprockets 69 on all of the crank shafts so that they will rotate in unison in the same direction.

Each rake member 57 carries a plurality of inverted, V-shaped rake teeth 58 at spaced apart intervals.

The trusses 52 support the rake members over the hay stack 14, and the crank shafts rotate clockwise in Fig. 1 so that when at the bottom, the rake members will move toward the columns 22, and when at the top they will move away from these columns so as to constantly rake hay from the top of the stack over the forward end thereof.

The hay falling over the forward end falls upon two conveyor belts 59, there being one belt extending outwardly at each side of the bed 13. The belts 59 are trained over rollers 60. The middle rollers 60 are driven in opposite directions by means of intermeshed gears 61 driven from the second counter-shaft 48 through the medium of beveled gears 62. The belts 59 carry the hay outwardly to the two sides of the trailer and deposit it in piles beyond the paths of the rear wheels 11.

A separating plate 70 is welded between members of the truss frames 52 immediately over each of the supporting studs 53. The plates 70 are cut out as shown at 71 in Fig. 9 for the passage of the drive crank shaft 43. The cut outs 71 are sufficiently large to allow the plates 70 to rock with the tilting movements of the cantilever trusses 52 without interfering with the crank shaft 43.

Stub shafts 72 are welded or otherwise secured to the plates 70 and project outwardly from the latter to rotatably support the idler sprockets 51.

A tie chain or cable 74 extending from the forward cross frame 66 to a connection with the brace frame 24. The length of the cable 74 is such that, when the sliding sleeves are elevated to their highest position this cable will tighten to lift the rearward extremities of the truss frames to the position of Fig. 1.

When in the latter position a stack of hay is loaded onto the bed 13. The trailer is then attached to a towing vehicle by means of the tongue 20. The motor 34 is started and the clutch 49 is engaged to start rotation of the rake crank shafts and the conveyor belts 59. When the place for scattering the hay is reached the clutch 40 is engaged to unwind the cable from the reel 33.

The sliding sleeves now gradually move downwardly slackening the pull cable 73 and allowing the rake teeth 38 to rest lightly on the stack 14, the weight being controlled by the counter-weight 54. The rakes rake the top hay in piles onto the two conveyors 59 which scatter it at both sides of the trailer.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A vehicle for hauling a hay stack and distributing hay from said stack, comprising: a wheel-supported stack-carrying bed; columns arising from a forward extremity of said bed; trusses extending rearwardly from said columns over the hay stack; crank shafts extending transversally between said trusses; rake bars extending in parallel relation between the cranks of said crank shafts; rake teeth projecting downwardly from said rake bars; means for rotating said crank shaft to cause said teeth to rake hay forwardly from the top of said stack; conveying means positioned to receive the raked hay and carry it to the side of said bed, said trusses being vertically movable on said columns; and means for lowering said trusses as said stack lowers.

2. A vehicle for hauling a hay stack and distributing hay from said stack, comprising: a wheel-supported stack-carrying bed; columns arising from a forward extremity of said bed; trusses extending rearwardly from said columns over the hay stack; crank shafts extending transversally between said trusses; rake bars extending in parallel relation between the cranks of said crank shafts; rake teeth projecting downwardly from said rake bars; means for rotating said crank shaft to cause said teeth to rake hay forwardly from the top of said stack; conveying means positioned to receive the raked hay and carry it to the side of said bed; and two aligned endless belt conveyors positioned to receive the raked hay from said stack, each of said conveyors projecting from an opposite side of said bed for carrying the raked hay oppositely outward to both sides of said bed.

3. A vehicle for hauling a hay stack and distributing hay from said stack, comprising: a vehicle adapted to support a stack of hay; a column projecting upwardly from each front corner of said vehicle; a vertically movable slide member on each of said columns; a tie beam extending between said slide members; flexible means supporting said tie beam; a cantilever truss frame pivoted on each slide member and extending rearwardly over and along each side of said vehicle; tie members securing the forward and rearward extremities of said truss frames together; crank shafts extending between said truss frames, each shaft having a plurality of cranks; rake bars extending between the cranks of the adjacent shafts; teeth extending downwardly from the rake bars; and means for rotating said crank shafts so as to rake hay from the top of said stack.

4. A vehicle for hauling a hay stack and distributing hay from said stack, comprising: a vehicle adapted to support a stack of hay; a column projecting upwardly from each front corner of said vehicle; a vertically movable slide member on each of said columns; a tie beam extending between said slide members; flexible means supporting said tie beam; a cantilever truss frame pivoted on each slide member and extending rearwardly over and along each side of said vehicle; tie members securing the forward and rearward extremities of said truss frames together; crank shafts extending between said truss frames, each shaft having a plurality of cranks; rake bars extending between the cranks of the adjacent shafts; teeth extending downwardly from the rake bars; and means for rotating said crank shafts so as to rake hay from the top of said stack.

5. A vehicle for hauling a hay stack and distributing hay from said stack, comprising: a vehicle adapted to support a stack of hay; a column projecting upwardly from each front corner of said vehicle; a vertically movable slide member on each of said columns; a tie beam extending between said slide members; flexible means supporting said tie beam; a cantilever truss frame pivoted on each slide member and extending rearwardly over and along each side of said vehicle; tie members securing the forward and rearward extremities of said truss frames together; crank shafts extending between said truss frames, each shaft having a plurality of cranks; rake bars extending between the cranks of the adjacent shafts; teeth extending downwardly from the rake bars; means for rotating said crank shafts so as to rake hay from the top of said stack; and a counter-weight carried by the forward extremities of said truss frames and partially supporting the weight of the rearward extremities thereof.

ALLAN J. KAYSER.

REFERENCES CITED

The following references are of record in the file of this patent:

UNITED STATES PATENTS

| Number | Name | Date |
|---|---|---|
| 1,148,314 | Hanson | July 27, 1915 |
| 1,570,360 | Lippoldt | Jan. 19, 1926 |
| 1,949,861 | Call | Mar. 6, 1934 |
| 2,185,415 | Miles | Jan. 2, 1940 |
| 2,321,168 | Tognetti | June 8, 1943 |
| 2,364,308 | Niewendorp | Dec. 5, 1944 |
| 2,458,031 | Rome | Jan. 4, 1949 |